United States Patent [19]

Brown

[11] 4,360,176
[45] Nov. 23, 1982

[54] WING LEADING EDGE SLAT

[75] Inventor: Robert B. Brown, Kent, Wash.

[73] Assignee: The Boeing Company, Seattle, Wash.

[21] Appl. No.: 91,026

[22] Filed: Nov. 5, 1979

[51] Int. Cl.³ .............................................. B64C 3/50
[52] U.S. Cl. ..................................... 244/214; 244/215
[58] Field of Search ............................... 244/213–219, 244/210, 130

[56] References Cited

U.S. PATENT DOCUMENTS 2,426,785  9/1947  Nauman .............................. 244/216

FOREIGN PATENT DOCUMENTS 360976  11/1931  United Kingdom ................ 244/214

*Primary Examiner*—Galen L. Barefoot
*Attorney, Agent, or Firm*—H. Gus Hartmann; Bernard A. Donahue

[57] ABSTRACT

A chordwise extensible wing leading edge system incorporating a rigid contoured panel member which is exposed during forward extension movement of the leading edge slat for closing in the proximity area between said slat and the relatively stationary leading edge portion of the wing, as a function of the forward movement of the slat. A further embodiment utilizes a second panel member so that both the upper and the lower surface contour of the wing airfoil envelope are aerodynamically continuous to complete the contour of the intervening space between the extended position of the slat and the stationary portion of the wing; whereby, this combination results in approaching the merits of wing cambering devices capable of operation at relatively high airspeeds as opposed to landing or take-off airspeeds.

25 Claims, 11 Drawing Figures

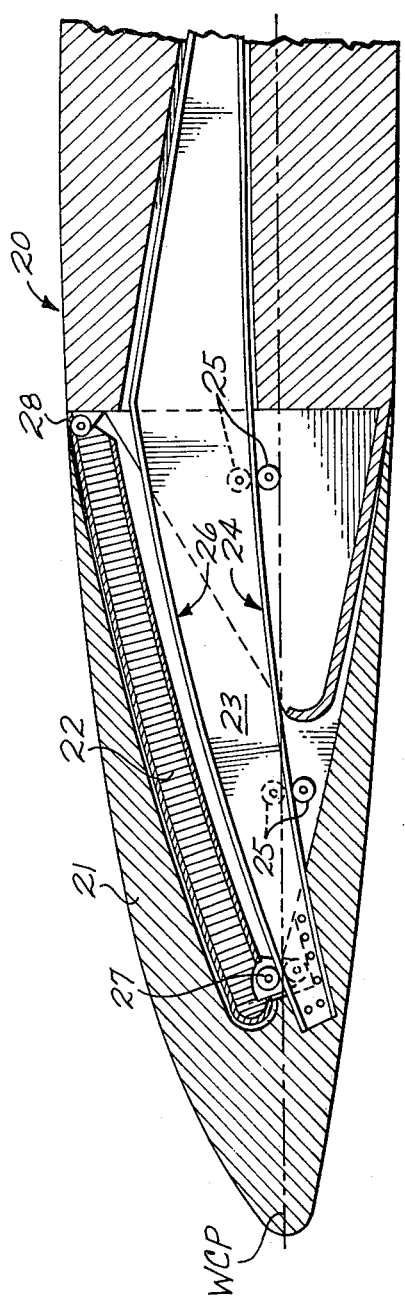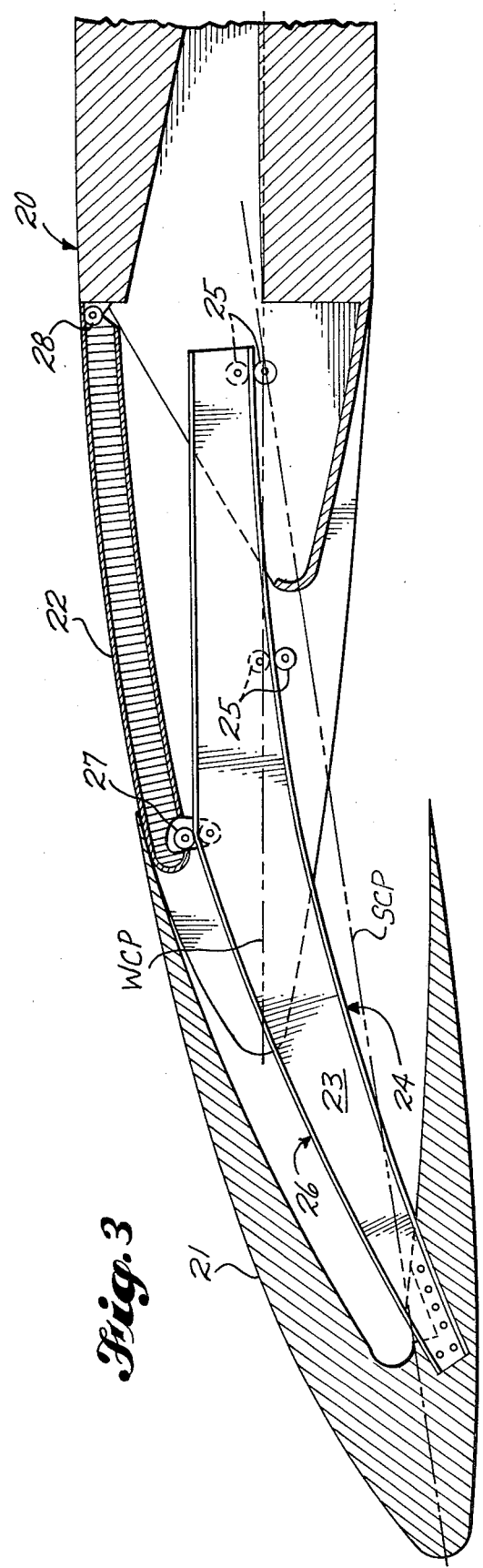
Fig. 1
Fig. 3

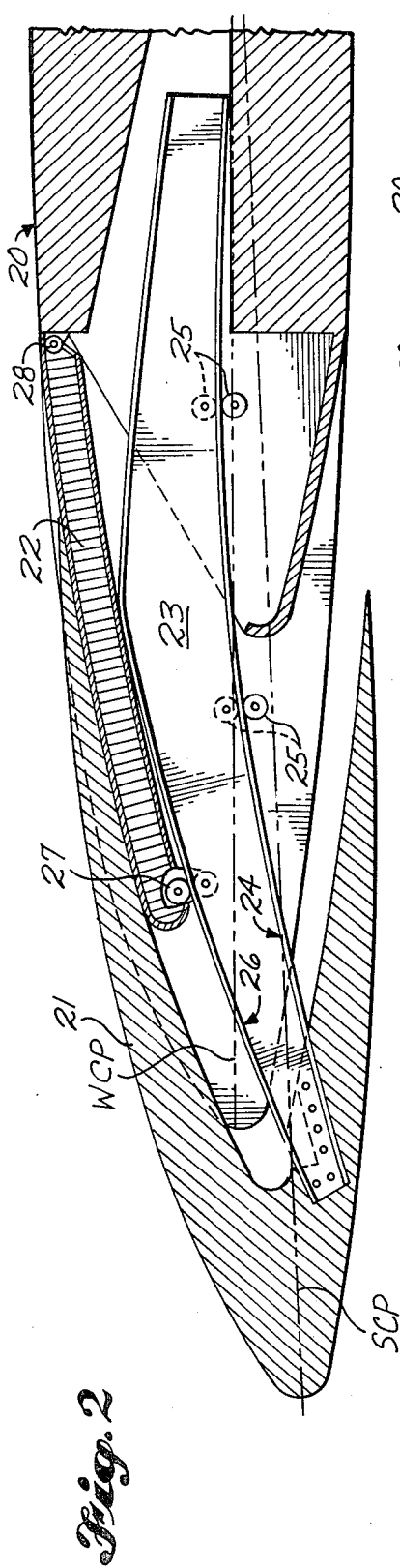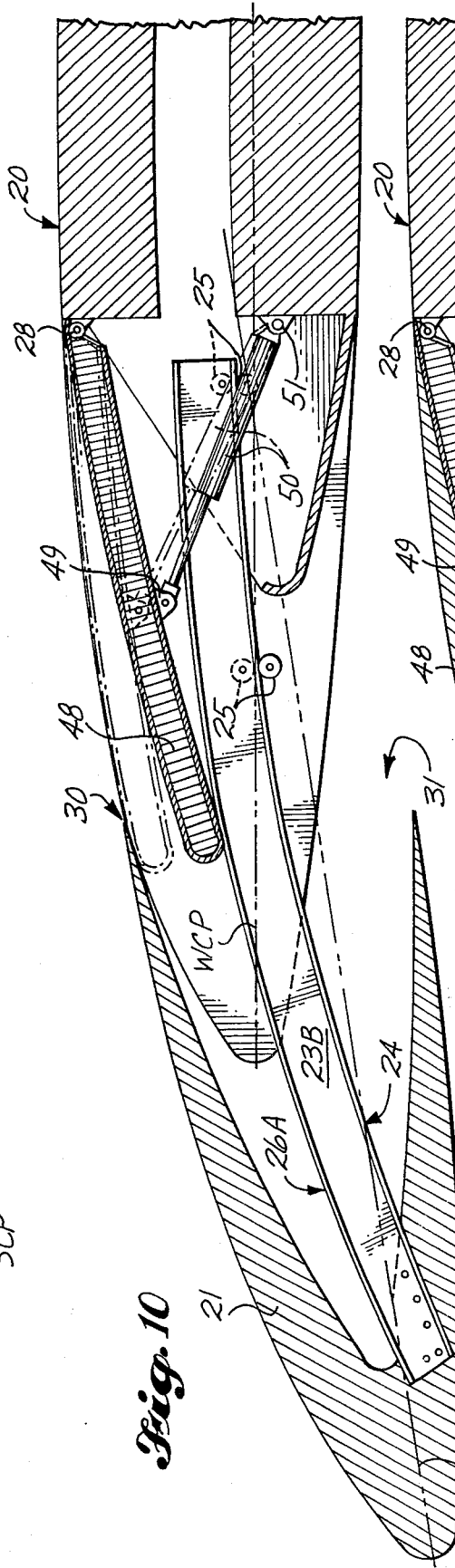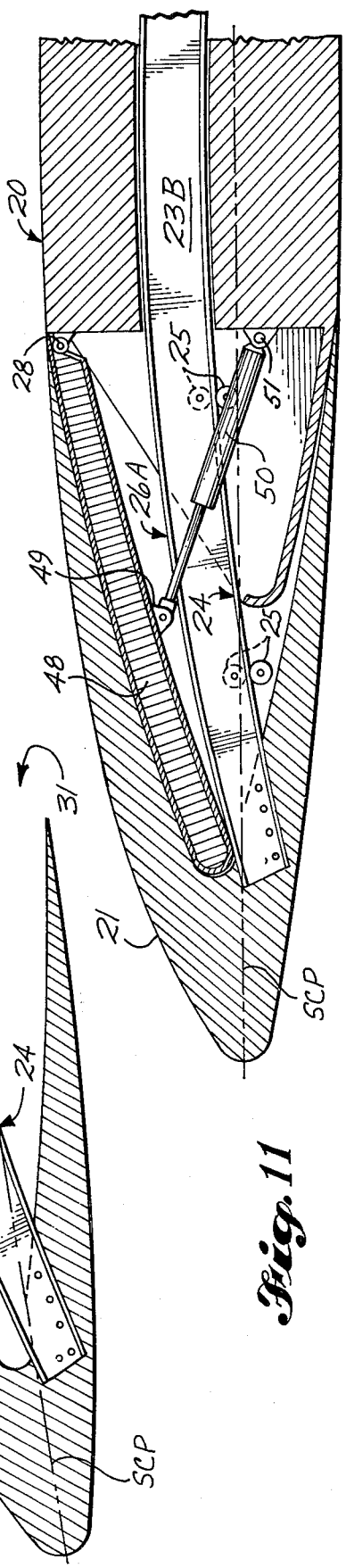

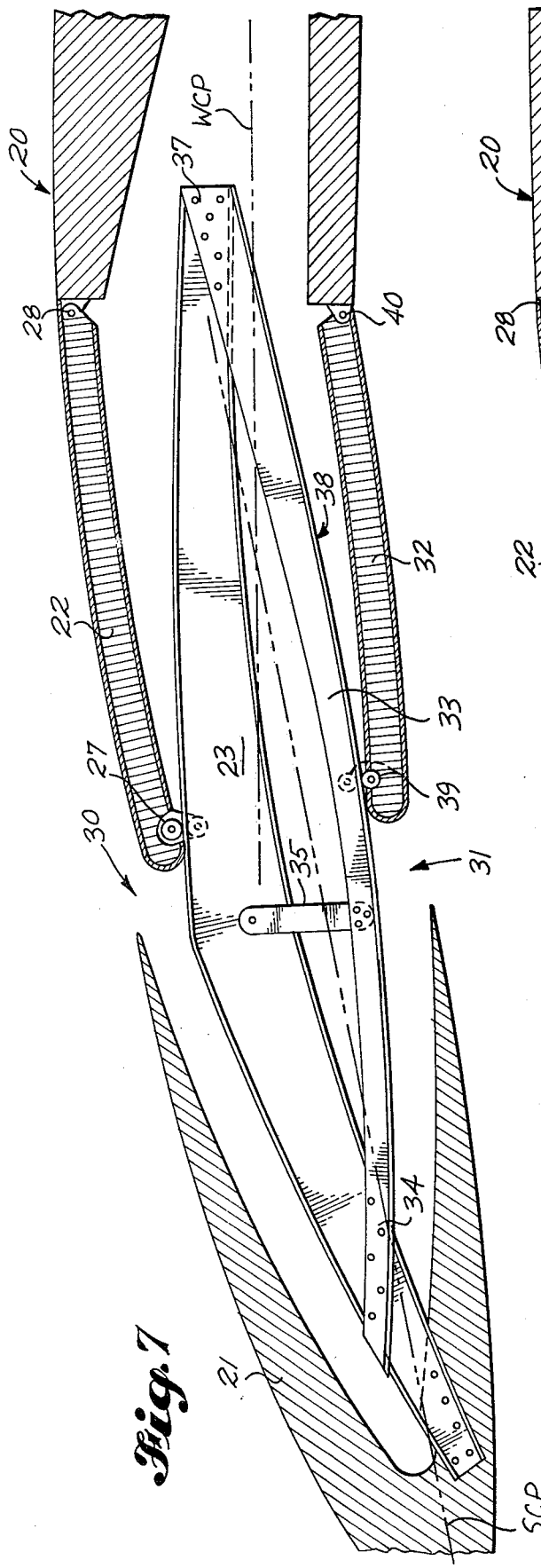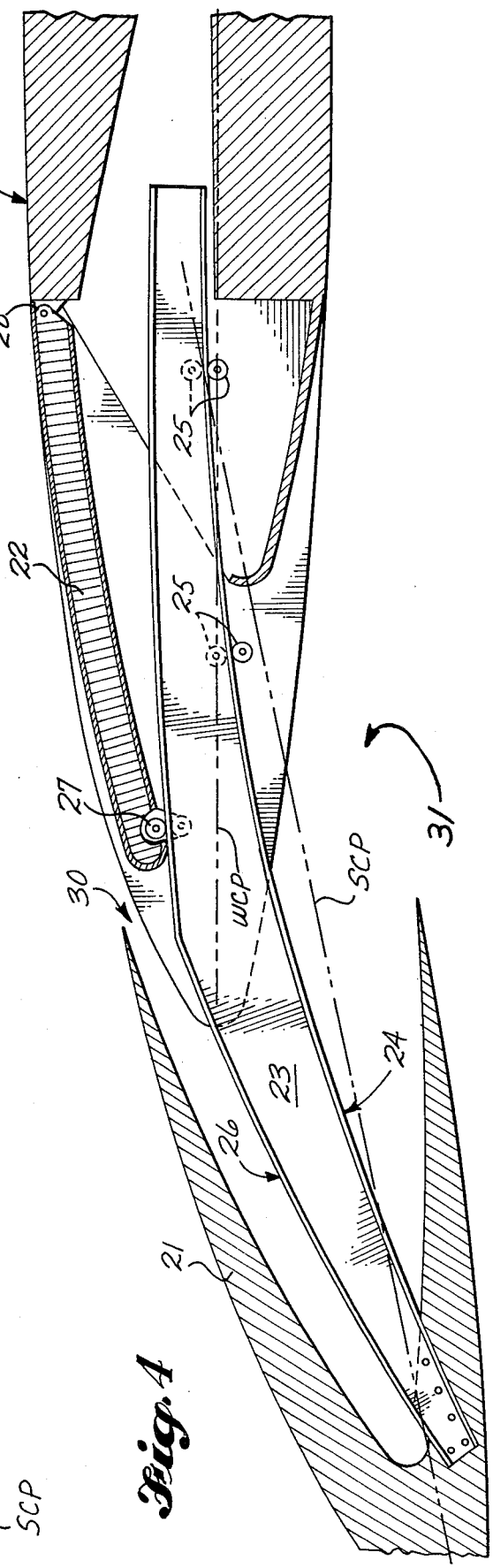

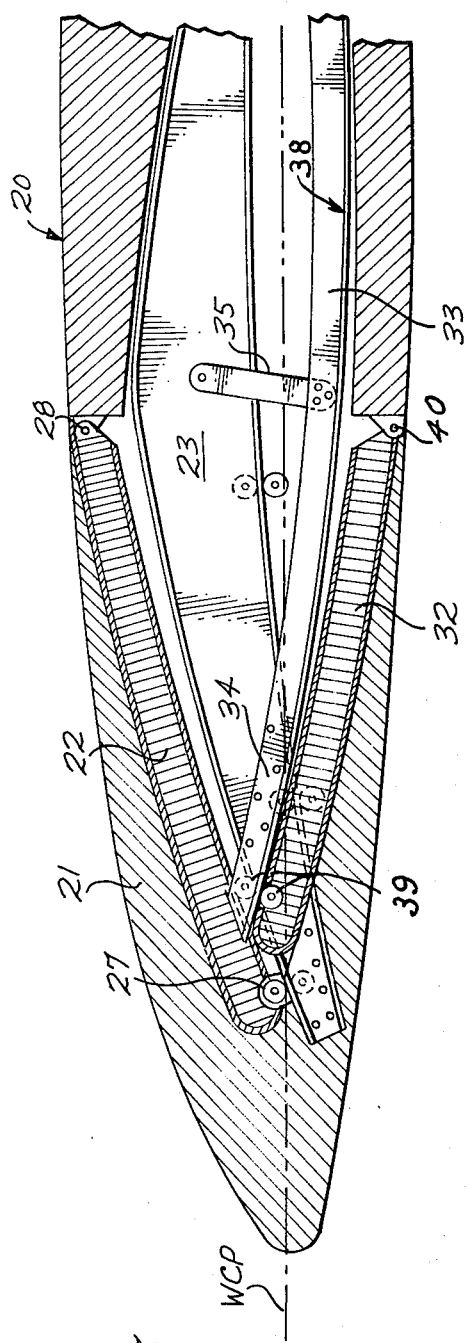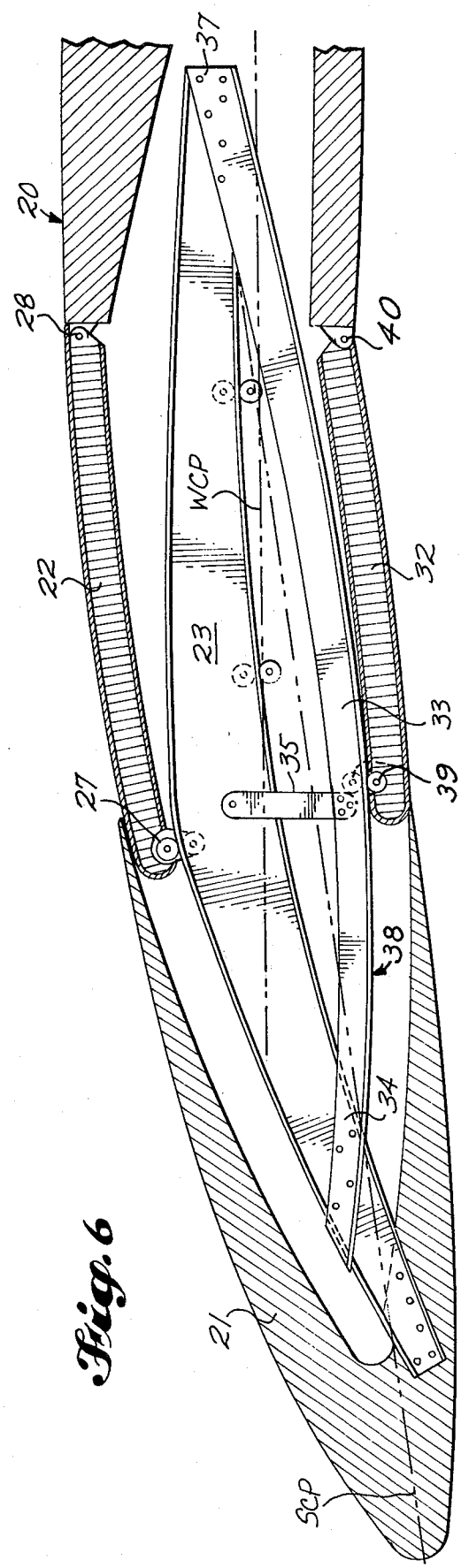

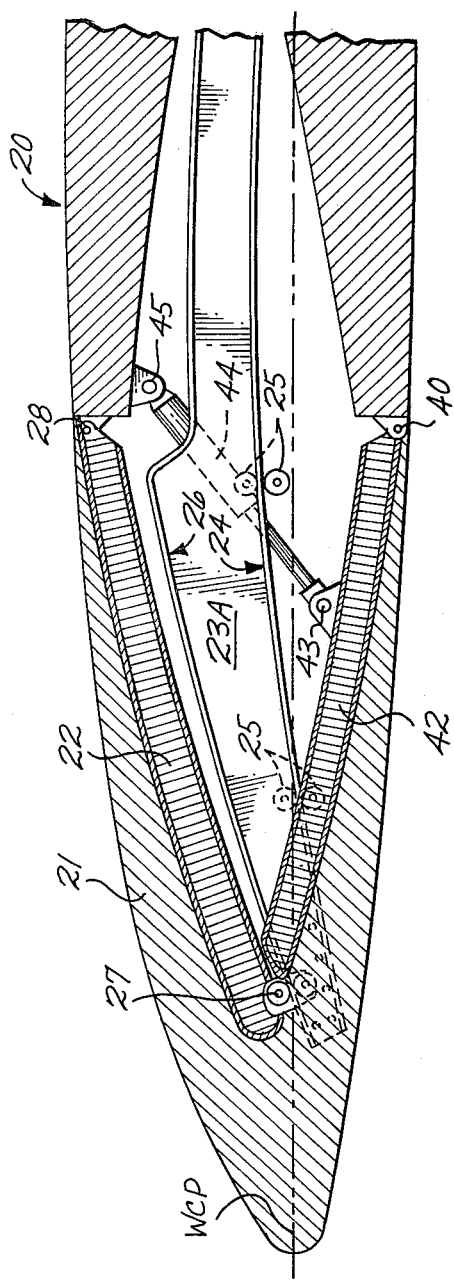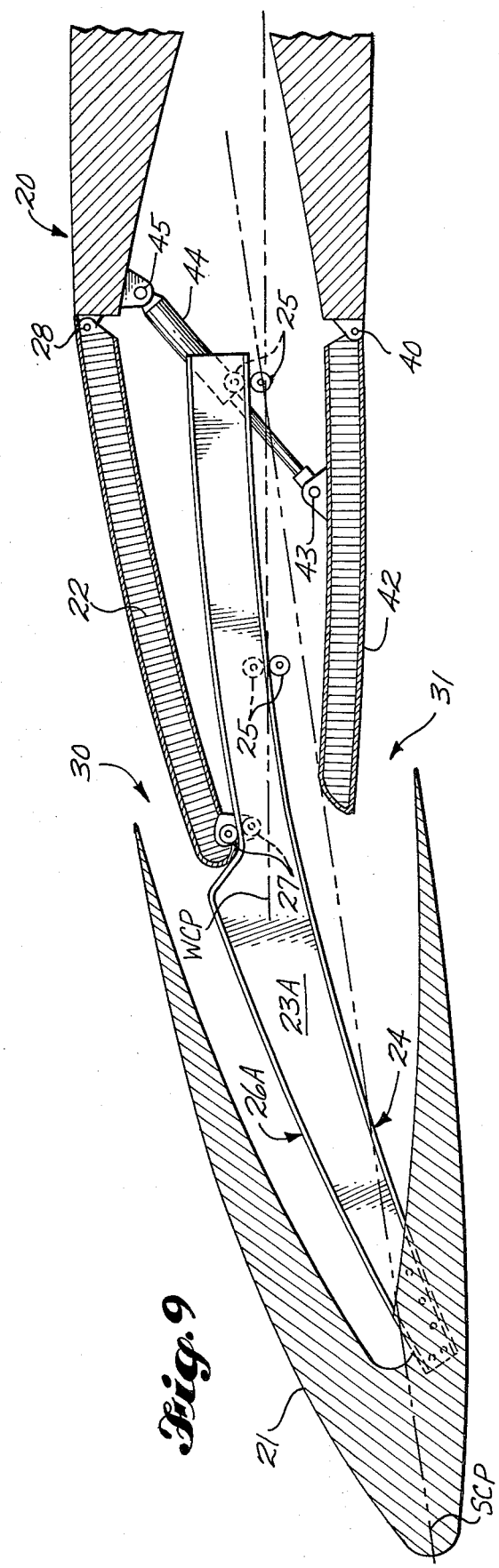

WING LEADING EDGE SLAT

SUMMARY OF THE INVENTION

A slat and a flap are variable camber devices for altering the aerodynamic shape of a wing airfoil section; and usually, the differentiation between them and what is termed "variable camber", is the aerodynamic smoothness that is accomplished by the different mechanisms for varying the camber. Conventional slats and flaps, for the leading edge of a wing, generally produce gaps and countour roughness when in their extended operating position; and known variable camber devices generally result in greater mechanical complexity than the present invention. In other words, there are all sorts of ideas on how to get a surface with significant extension forward from the fixed leading edge of the wing and bend it into a variety of shapes to match the flight condition. Some ideas are better aerodynamically than conventional slat and flap devices, but they are generally all more complex and of questionable solution structurally.

This invention comes in between a conventional slat and a true variable camber wing leading edge device, but it does retain the mechanical simplicity of the conventional slat, while retaining a major portion of the smooth curvature of the variable camber device; therefore, it is really a means for obtaining a relatively ideal upper surface smoothness combined with variable camber of the overall wing airfoil cross-section, without any flexible components and with a non-complex actuation mechanism.

An object of the invention is to eliminate the upper surface discontinuity between a forward extended leading edge slat and the stationary leading edge of a wing, which is fundamental to a conventionally extended slat.

BRIEF DESCRIPTION OF THE DRAWINGS

FIG. 1 is a chordwise cross-sectional view of the leading edge slat of the present invention, in a fully retracted and stowed position whereat it completes the external nose profile of an airfoil envelope and extends a substantial distance chordwise along both the upper and lower surface thereof.

FIG. 2 is a view similar to FIG. 1 with the leading edge slat at a slightly extended operative position whereat the combined movable slat and the stationary section of the airfoil form an increase in planform area and an increase in airfoil camber; and this position could be used for increasing the lift coefficient at high speed cruise flight.

FIG. 3 is a view similar to the preceding views of FIGS. 1 and 2, showing the slat at a further extended operative position whereat a spanwise panel member is exposed during extension of the slat from the stowed position, for spanning a gap formed between the slat and the stationary section of the airfoil, to form an aerodynamically continuous upper surface contour; and this slat position would generally be used for take-off mode of airplane operation.

FIG. 4 is a view similar to the preceding views of FIGS. 1–3, showing the slat at its fully extended operative position whereat an aerodynamic slot is formed between the trailing edge of the slat and the leading edge of the fully exposed upper panel member; and this slat position would generally be used for the landing mode of airplane operation.

FIG. 5 is a chordwise cross-sectional view of a second embodiment of the leading edge slat in a fully retracted and stowed position whereat it completes the nose section of the airfoil envelope; and encloses both an upper and a lower panel member.

FIG. 6 is a view similar to FIG. 5 with the slat at an extended operative position similar to FIG. 3, whereat both the upper and the lower panel members are fully exposed for spanning the gap formed between the extended slat and the stationary section of the airfoil, to form an aerodynamically continuous upper and lower surface contour.

FIG. 7 is a view similar to the preceding views of FIGS. 5 and 6, showing the slat at its fully extended operative position whereat an aerodynamic slot is formed between the upper and lower trailing edges of the slat and the upper and lower leading edges respectively of the fully exposed panel members.

FIG. 8 is a chordwise cross-sectional view of a third embodiment of the leading edge slat in a fully retracted and stowed position; and depicts an upper panel member guided at its leading edge by a cam track and the lower panel member controlled by an actuator.

FIG. 9 is a view similar to FIG. 8 with the slat at an extended operative position, whereat an aerodynamic slot is formed between the upper and lower trailing edges of the slat and the leading edges of the upper and lower panel members respectively.

FIG. 10 is a chordwise cross-sectional view of a fourth embodiment of the leading edge slat at an extended operative position, whereat the upper panel member is controlled by an actuator for: either forming an aerodynamic slot between the upper trailing edge of the slat and the leading edge of the panel member, or for closing-off the slot.

FIG. 11 is a view similar to FIG. 10 with the slat at the fully retracted and stowed position, whereat it completes the nose section of the airfoil envelope.

DESCRIPTION OF THE PREFERRED EMBODIMENTS

FIGS. 1 to 4, are chordwise cross-sectional views of a preferred embodiment of the leading edge slat of the present invention, at different operating positions i.e., from a fully retracted and stowed position shown in FIG. 1, to a fully extended position shown in FIG. 4.

Referring to FIG. 1, the wing 20 has a leading edge slat 21 which forms a complete nose section for the wing airfoil envelope. The slat 21 has both an upper and lower surface that extends a substantial distance aft in a chordwise direction from the leading edge of the wing airfoil envelope; and the trailing edges of both the upper and lower surfaces of the slat are faired into the cross-sectional configuration of the wing airfoil envelope, without the formation of boundary layer airflow disturbances due to surface discontinuities. Housed within the leading edge portion of the wing airfoil envelope, is a rigid contour panel member 22 and a chordwise oriented I-beam 23.

The I-beam 23 has a lower arcuate contoured flange 24 which forms a first cam track that is slidably supported on rollers 25 which have their axies fixed to wing structure. The forward extremity of the I-beam 23 is fixedly attached to the slat 21.

The I-beam 23 has an upper, double arcuate contour, flange 26 which forms a second cam track for slidably connecting, through a roller follower arrangement 27, to the leading edge of the panel member 22. The upper surface of panel member 22 is completely covered by the retraced position of the slat 21; and the trailing edge of panel member 22 is hinged adjacent to the upper surface of the wing along a spanwise hinge axis 28.

FIG. 2 is a view similar to FIG. 1 and shows the leading edge slat 21 slightly extended forwardly from the relatively stationary portion of the wing by actuating means (not shown) through the action of the upper flange 23 engaging the support rollers 24. At this slightly extended position of the slat 21, the combined upper surface area of the slat 21 and that of the partially exposed panel member 27, results in an increase in the overall planform area of the wing airfoil envelope. Further, due to the arcuate contour of the lower flange 24, the slat describes a predetermined curvilinear trajectory which results in a downward deflection of the slat chord plane SCP relative to the wing chord plane WCP; and this results in an increase in camber and also in an increase in the lift-coefficient of the overall wing airfoil envelope.

FIG. 3 is a view similar to the preceding views of FIGS. 1 and 2, and shows the leading edge slat 21 at a further extended position; whereat, the panel member 22 is substantially fully exposed for spanning the gap formed between the slat 21 and the stationary section of the wing to form an aerodynamically continuous upper surface contour without the formation of an upper surface discontinuity between the extended slat 21 and the relatively stationary section of the wing. The upper, double arcuate contoured flange 26, of the I-beam 23, which is connected through the roller follower 27 to the leading edge of panel member 22, simultaneously alters the angle-of-deflection of the panel member 22 during forward extension movement of the slat 21 to produce the aerodynamically streamlined upper surface contour between the extended slat 21 and the upper stationary surface of the wing. At this almost fully extended position of the slat 21, the combined upper surface area of the slat 21 and the fully exposed panel member 22, results in a substantial increase in the overall planform area of the wing; and at this exposed condition, the panel member 22 is subjected to substantial aerodynamic lift loads. However, due to the rigid contour construction of the panel member 22, it is capable of sustaining these loads without chordwise bending and of transferring these loads: spanwise along its rearward portion through its trailing edge hinge connection 28 to the wing structure, and at its forward portion through the roller follower 27 connection to the I-beam 23. Further, the rigid contoured upper surface of the panel member 22, because of the upper double arcuate contoured flange 26, is associated with the trailing edge portion of the slat 21 such that the exterior upper surface of the panel member 22 remains in air-sealing contact with the trailing edge surface of the slat 21 during extension movement of the slat 21, to form an aerodynamically faired upper surface between the extended slat segment and the wing. During extension movement of the slat 21 to this extended position, the slat 21 describes the predetermined curvilinear trajectory determined by the arcuate contour of the lower flange 24 of the I-beam 23 and this results in an increase in the downward angle-of-deflection of the slat chord plane SCP relative to the wing chord plane WCP, which increases airfoil camber and lift-coefficient of the overall wing airfoil envelope from that shown in either of the preceding slat positions of FIG. 1 or 2.

In the extended position of the slat 21 shown in FIG. 3, it is possible to get a very good alignment between the upper surfaces of the slat 21 and the panel member 22 where the trailing edge of the slat 21 merges with the upper leading edge surface of the panel member 22; and also, between the upper trailing edge surface of the panel member 22 and the adjacent stationary upper surface of the wing leading edge. However, there are intermediate positions in the extension and retraction operation of the slat 21 where there may be a slight aft-facing step or discontinuity in the contour of the upper surface between the slat 21 and the panel member 22, because the trailing edge of the slat 21 may not conform or merge perfectly with the surface contour of the panel member 22. The extended position of the slat 21 shown in FIG. 3, may be the only position where the upper surface of the slat 21 merges smoothly with the upper surface of the panel member 22 and the upper wing surface. With the slat 21 at an intermediate position, as shown in FIG. 2, the slight aft-facing step will produce some aerodynamic drag; however, the improvement in lift characteristics far outweigh the drag detriment. Further, the intermediate operating positions of the slat 21 would be of great value in extending the performance parameters of an aircraft, especially a military aircraft. A military aircraft, with a full bomb load or maximum payload of munitions, could take off with the slat set at some intermediate position for increasing the wing camber in flying to the target; and after the bombs or munitions were unloaded, the slat could be repositioned to the retracted high speed cruise position.

Referring to FIG. 3, if the panel member 22 were to be removed, there would be an opening left between the slat 21 and the exposed stationary leading edge of the wing; and it would be evident that there was an abrupt change-in-slope at the hinge point 28 between the exposed wing leading edge surface and the upper surface of the wing. This point of discontinuity on the wing leading edge surface left exposed by the extended slat 21, is generally fundamental to a conventionally extended slat because there is a trailing edge cross-sectional closure angle or a finite limiting wedge angle, which is depicted in the figures as approximately 7 degrees, and this is due to structural reasons i.e., the sizing of the angle is directly related to the amount of aerodynamic lift loads imposed upon the trailing edge of the extended slat 21, without deforming.

Further, the abrupt change-in-slope at hinge 28 causes a disruption of the airflow which will have an adverse effect on the aerodynamic drag characteristics of the wing, especially during take-off and climb-out operation of the airplane. The slat system with the least aerodynamic drag is the one without any surface discontinuity over the upper surface of the fixed portion of the wing left exposed by the extended slat and in reality, also without any opening left between the slat and the stationary leading edge of the wing along the lower surface. However, it may not be feasible to close up this opening in the lower surface because it does not create as great a problem with respect to the aerodynamic drag forces generated as that of the upper surface.

Wind tunnel test results have indicated a measurable advantage in the take-off performance of an airplane that has a smooth and continuous upper surface between the extended slat and the stationary leading edge of the wing.

A twin-engined airplane is especially critical of aerodynamic drag during take-off operation, in comparison to a three or four-engined airplane because they lose a lesser percentage of their total thrust due to an engine-out condition. So, the prospect of making the upper surface, between the extended slat and the stationary leading edge, continuous and completely smooth, is most beneficial for the twin-engined airplane.

By utilizing an extensible wing leading edge slat together with exposing, by slat extension, a contoured panel member to span and complete the aerodynamic contour of the intervening space between the extended slat and the relatively stationary leading edge of the wing, results in this combination approaching the merits of known wing cambering devices which are capable of operation at relatively high airspeeds as opposed to landing and take-off airspeed operation; and this is accomplished by the slat and panel combination without the generally complicated and heavy mechanical mechanisms associated with the known wing cambering devices.

FIG. 4 is a view similar to the preceding views of FIGS. 1 to 3, and shows the wing leading edge slat 21 at its fully extended operative position; whereat, an aerodynamic slot 30 is formed between the trailing edge of the slat 21 and the leading edge of the fully exposed panel member 22. The leading edge of panel member 22, which is connected through the roller follower 27 to the upper, double arcuate contoured flange 26 of the I-beam 23, is supported and guided by the upper cam track flange 26, during forward extension movement of the slat 21, to provide the aerodynamic slot tailoring 30 for producing an auxiliary throughflow energy to the streamwise upper surface boundary layer airflow to maintain attachment of the streamwise flow to the upper surface of the overall wing airfoil envelope and alleviate aerodynamic stall.

Airplanes are ultimately limited on gross-weight for take-off by their ability to continue to fly at some reasonable climb-out-angle after they've become airborne. Therefore, if an airplane is being loaded to the ultimate gross-weight and an addition is required to maintain some reasonable climb-out-angle with maximum engine thrust, then the leading edge slat and interposed panel, as shown in FIGS. 1 to 3, would be most beneficial; because it would produce less aerodynamic drag than present known conventional leading edge slat devices. Further, for such a highly loaded airplane, the landing approach and touch-down airspeed may not be a critical design requirement because a great deal of the take-off gross-weight is used up in fuel and weapons and there may be no reason to design for the lowest landing airspeed. Therefore, if the primary objective is to design a wing leading edge high-lift device with the maximum lift characteristics and least aerodynamic drag at take-off operation, then the slat and interposed panel arrangement shown in FIGS. 1 to 3 would provide a good solution; however, if the objective is to provide for both the take-off and the landing mode of airplane operation, then the complexity of the slat system may increase; because, a slat with an interposed aerodynamic slot between it and the stationary leading edge of the wing as shown in FIG. 4, would provide the lowest possible or most desirable approach letdown and landing airspeed for the airplane.

For a short-range airplane, it would be more desirable to have a high-lift device as shown in FIG. 4 on the wing which would produce a near optimum or maximum lift-coefficient for the landing mode and a less than optimum lift-coefficient for the take-off mode; because, the gross-weight of an airplane at take-off would be too close to the gross-weight at landing. However, for a long-range airplane, the slat and interposed panel arrangement of FIGS. 1 to 3 would be of greater benefit because there would be a greater difference between the gross-weights of the airplane at take-off and at landing due to the expendable fuel load.

Referring to the fully retracted position of the slat 21 shown in FIG. 1, if instead of the rigid contour constructed panel member 22, a flexible panel were to be used and bent without hinging, the flexible panel would not avoid an upper surface discontinuity in the high speed wing airfoil section; because, the upper surface of the panel, which is underneath the trailing edge of the slat 21 or the slat wedge area, has to have a very abrupt change-in-slope at the location of the hinge line 28, or the upper surface contour of the slat 21 cannot be made to conform to the desired high speed wing airfoil section when the slat 21 is in the fully retracted position. Further, in order for the slat 21 to have sufficient strength at its trailing edge, it is limited in its structural thickness to a minimum wedge-angle of aproximately 7 degrees and this wedge-angle must be made to end abruptly, it cannot be made to feather out. Therefore, with the slat 21 in the fully retracted position, a very abrupt change-in-slope is formed between the juncture of the panel upper surface and the fixed upper surface of the structural wing skin, at the location of the hinge-line 28. At this location, the abrupt change-in-slope produces a discontinuity that is inherent, in order to provide the necessary structure to close off the gap between the extended slat 21 and the fixed leading edge of the wing, as performed by the panel member 22. By hinging the trailing edge of the panel member 22 to the front wing spar structure allows it to be rotated about hinge line 28 during extension of the slat 21, by a roller and track arrangement, such that when the leading edge of the panel member 22 is elevated to the trailing edge of the slat 21, the aft upper surface of the panel member 22 emerges to a position where it is in perfect alignment with the upper surface of the structural wing skin. Therefore, by hinging the panel member 22, as opposed to flexibly bending it, allows the threat of upper surface discontinuity to be removed.

FIGS. 5 to 7 are chordwise cross-sectional views of a second embodiment of the invention and show a wing leading edge slat and panel member arrangement somewhat similar to that shown in FIGS. 1 to 4, with the exception that a second lower panel member and its cam track arrangement are added. Those elements which are similar to those previously described have been given like reference numerals and where there are some differences in the elements, they have been identified with different numerals or a letter suffix has been added.

Referring to FIG. 5, the wing 20 has a leading edge slat 21 in a fully retracted and stowed position whereat it forms a complete nose section for the wing airfoil envelope. The slat 21 has both an upper and a lower surface that extends a substantial distance aft in a chordwise direction from the leading edge of the airfoil envelope to enclose both an upper panel member 22 and a lower panel member 32. Also, housed within the leading edge portion of the wing airfoil envelope is a chordwise oriented I-beam 23 having an L-beam 33 spaced spanwise therefrom by spacer means (not shown) fixedly attached thereto. The L-beam 33 is attached to the I-beam 23 at the following locations: chordwise forwardly at 34; at mid-length through support link 35; and chordwise aft at 37. The L-beam 33 has an arcuate contoured flange 38 which forms a third cam track for slidably connecting, through a roller follower arrangement 39, to the leading edge of the lower panel member 32. The trailing edge of panel member 32 is hinged adjacent to the lower surface of the wing along a spanwise hinge axis 40. In the fully retracted position of the slat 21 shown in FIG. 5, the undersurface of panel member 32 is completely covered by the lower surface of the slat 21, which extends a substantial distance aft in a chordwise direction from the leading edge of the airfoil envelope, in a similar manner to that of the upper panel member 22.

FIG. 6 is a view similar to FIG. 5 and shows the leading edge slat 21 at an extended position; whereat, both the upper and lower panel members, 22 and 32 respectively, are substantially fully exposed for completely spanning the gap formed between the slat 21 and the relatively stationary section of the wing, so as to form an aerodynamically continuous upper and lower surface contour without the formation of either an upper or a lower surface discontinuity between the extended slat 21 and the relatively stationary portion of the wing. The lower panel member 32 is simultaneously altered in angle-of-deflection, with forward extension movement of the slat 21, to produce an aerodynamically streamlined lower surface contour between the extended slat 21 and the lower stationary surface of the wing, in a similar manner to that of the upper panel member 22.

FIG. 7 is a view similar to the preceding views of FIGS. 5 and 6, and shows the leading edge slat 21 at a further forward extended position, whereat, both the upper and lower panel members, 22 and 23 respectively, are fully exposed and form: an aerodynamic slot 30 in the upper surface contour of the wing airfoil envelope and a gap 31 in the lower surface contour of said envelope. The leading edge of the upper panel member 22, which is connected through the roller follower 27 to the upper, double arcuate contoured flange 26 of the I-beam 23, is supported and guided by the upper flange cam track 26, during forward extension movement of the slat 21, to provide tailoring of the aerodynamic slot 30; and the leading edge of the lower panel member 32, which is connected through the roller follower 39 to the arcuate contoured flange 38 of the L-beam 33, is supported and guided by the cam track flange 38, during forward extension movement of the slat 21, to provide the gap 31 in the lower surface of the airfoil envelope contour. The combination of the aerodynamic slot 30 in the upper surface, between the upper trailing edge of the slat 21 and the leading edge of the upper panel member 22, and the gap 31 in the lower surface, between the lower trailing edge of the slat 21 and the leading edge of the lower panel member 32, with proper geometric sizing of the entry and exit areas, will produce an auxiliary throughflow energy to the streamwise airflow over the upper surface of the overall wing airfoil envelope to maintain attachment of the upper surface boundary layer and alleviate aerodynamic stall conditions.

FIGS. 8 and 9 are chordwise cross-sectional views of a third embodiment of the invention showing a wing leading edge slat 21 enclosing an upper and a lower panel member 22 and 42 respectively, arranged in a manner somewhat similar to that shown in FIGS. 5 to 7, with the exception: that the chordwise oriented I-beam 23 has an upper flange 26 with a cam track 26A that has been modified from that shown in the previous embodiments; and, a lower panel member 42 that is actuated independently of the upper panel member 22, during forward extension movement of the slat 21.

Referring to FIG. 8, the slat 21 is shown in a fully retracted position; whereat, both an upper and a lower panel member, 22 and 42 respectively, is completely enclosed by the chordwise aft extending, upper and lower surfaces of the slat 21, in a manner similar to that shown in FIG. 5. The lower panel member 42: has its trailing edge hinged at 40 to lower wing structure; and, is connected at approximately mid-length, at 43, to one end of actuator 44 which is attached at the other end 45 to upper wing structure.

FIG. 9 is a view similar to FIG. 5 and shows the leading edge slat 21 at an extended position; whereat, both the upper and the lower panel member, 22 and 42 respectively, is substantially fully exposed and forms: an aerodynamic slot 30 in the upper surface contour of the wing airfoil envelope and a gap 31 in the lower surface contour of said envelope, somewhat similar to that shown in FIG. 7. In FIG. 9, the leading edge of the upper panel member 22 is connected through roller follower 27 to the upper, double arcuate contoured flange 26A of the I-beam 23A which is extensibly supported and guided on rollers 25 having their axies fixed to relatively stationary wing structure. During forward extension movement of the slat 21, from the retracted position shown in FIG. 8 to the extended operative position shown in FIG. 9: the leading edge of the upper panel member 22, through roller follower 27, is guided by the upper flange cam track 26A to provide tailoring of the aerodynamic slot 30 and, the lower panel member 42 is connected at mid-length to actuator 44 which provides control of the gap opening size in the lower surface envelope contour. This combination of an aerodynamic slot 30 in the upper surface and the gap 31 in the lower surface provides a throughflow between the upper and lower surfaces that directs an energized airflow to the upper surface boundary layer airflow which aids in maintaining attachment of the streamwise airflow and alleviate aerodynamic stall conditions, similar to that shown in FIG. 7.

FIGS. 10 and 11 are chordwise cross-sectional views of a fourth embodiment of the invention and show a wing leading edge slat and panel member arrangement somewhat similar to that shown in FIGS. 1 to 4, with the exception that the upper panel member is actuated independently during forward extended operating positions of the slat. Those elements which are similar to those previously described have been given like reference numerals and where there are some differences in the elements, they have been identified with different numerals or a letter suffix has been added.

Referring to FIG. 10, the wing 20 has a leading edge slat 21 at a forward extended operative position; whereat, an upper panel member 48 is substantially fully exposed for spanning the gap formed between the extended slat 21 and the relatively stationary portion of the wing 20. The upper panel member 48 is connected at approximately mid-length, at 49, to one end of an actuator 50 which is attached at its opposite end 51 to wing structure. The upper panel member 48 is of rigid contour construction for sustaining aerodynamic loads without chordwise bending and of transferring these loads to wing structure through its trailing edge hinge connection 28 and its mid-length actuator 50. The actuator 50 functions to rotate the upper panel member 48 about its trailing edge hinge axis 28, to control the opening size of the gap 30 between the trailing edge of the slat 21 and the leading edge of the upper panel member 48, for providing either an aerodynamic slot or a non-slotted arrangement depicted in dash-dot outline. In the aerodynamic slot forming position of the upper panel member 48 (shown in solid outline) a throughflow is provided between the upper and lower surfaces of the overall wing airfoil envelope in order to direct an energized airflow to the upper surface boundary layer for maintaining attachment of the streamwise airflow and alleviate aerodynamic stall conditions, similar to that shown in FIG. 4. In the non-slotted position of the upper panel member 48 (shown in dash-dot outline) the exterior upper surface of panel member 48 is in air-sealing contact with the trailing edge surface of the slat 21 for producing an aerodynamically streamlined upper surface contour between the extended slat 21 and the upper stationary surface of the wing, similar to that shown in FIG. 3. Also, movement of panel member 48 could be scheduled in combination with the forward extending movement of the slat 21, by controlling movement of a servo valve (not shown) that would control the actuator 50 and the panel member 48, as a function of slat position. Further, movement of the panel member 48 could be programed in another manner (not shown) such that the panel member 48 would always stay in contact with the upper trailing edge surface of the slat 21, until it was determined to position the leading edge slat system for a landing configuration; at which time, the panel actuator 50 would be given a signal to move down and open an aerodynamic slot 30, for the landing operation. In addition, the timely actuation of panel member 48 could produce a beneficial aerodynamic effect if it were to open the slot 30 just prior to encountering stall conditions of the faired or unslotted position. One method would be to actuate the panel member 48 as a function of the angle-of-attack of the airplane. The slot 30 would be beneficial for longitudinal stability of the airplane; and also, could be utilized to eliminate the adverse effect of icing at the leading edge of the wing. These methods of panel member 48 operation, are not as simple as the track and roller follower arrangement shown in the previous embodiment wherein, the panel member is slaved directly off-of the main slat track I-beam 23. However, these methods do accomplish a broader objective with an increase in complexity of the slat system which may not be desirable from a fail safe design standpoint.

FIG. 11 is a view similar to FIG. 10 and shows the leading edge slat 21 in a fully retracted and stowed position; whereat, it forms the complete nose section for the wing airfoil envelope; and the trailing edges of both the upper and lower aft extending surfaces of the slat are aerodynamically faired into the wing airfoil cross-section, without surface discontinuities, similar to FIG. 1.

When the slat 21 is in the fully retracted position, shown in FIG. 11, there is a combined wedging and abutment locking action between: the interior surface of the slat 21; the leading edge section of the panel member 48; and the upper flange 26A of the chordwise oriented I-beam 23B. This inter-wedging and abutment relationship, aids in the structural rigidity of said members to prevent the possibility of vibration of the leading edge portion of the wing airfoil envelope when the slat 21 is in the fully retracted position.

While the invention has been disclosed with reference to preferred embodiments, it is to be understood that those modifications and changes which become obvious to a person skilled in the art to which this invention pertains, as a result of the teachings hereof, are considered to be encompassed by the following claims.

I claim:

1. A leading edge high-lift generating device for an airfoil, comprising: a spanwise segment forming the nose structure of the airfoil, and having both an upper and a lower trailing edge surface faired into the cross-sectional configuration of the airfoil, without any aerodynamic surface discontinuities, when in a fully retracted and stowed position; a cam track mechanism operatively connected to said spanwise slat segment for curvilinear extension movement thereof from a stowed position to a forward and downward extended operative position relative to the airfoil; a spanwise panel member being exposed by forward curvilinear extension of the spanwise slat segment from the stowed position and being hinged spanwise along its trailing edge to the airfoil; said cam track mechanism being operatively connected to the leading edge of said spanwise panel member for supportably guiding said spanwise panel member, during forward extension movement of said spanwise slat segment, to a position for forming an aerodynamically continuous surface contour between said spanwise slat segment and the airfoil during extension of said spanwise slat segment from the stowed position.

2. The leading edge high-lift generating device as set forth in claim 1, wherein: said spanwise panel member being of rigid contour construction capable of sustaining aerodynamic loads without chordwise bending and transferring said aerodynamic loads spanwise along its trailing edge through its hinge connection to the airfoil and at its leading edge through its connection to said cam track mechanism.

3. The leading edge high-lift generating device as set forth in claim 1, wherein: said spanwise panel member having a rigid contoured surface associated with the trailing edge portion of said spanwise slat segment such that the exterior surface of said spanwise panel member remains in air-sealing contact with the trailing edge surface of said spanwise slat segment during extension movement of said spanwise slat segment, for forming an aerodynamically faired surface between the extended spanwise slat segment and the airfoil.

4. The leading edge high-lift generating device as set forth in claim 1, wherein: said cam track mechanism being slidably connected to the leading edge of said spanwise panel member for guiding said spanwise panel member, during forward extension movement of said spanwise slat segment, to a position at which an aerodynamic slot is formed between the trailing edge surface of said spanwise slat segment and the surface of said spanwise panel member.

5. The leading edge high-lift generating device as set forth in claim 1, wherein: said cam track mechanism comprises a beam fixedly attached at its forward extremity to said spanwise slat segment and slidably supported along its rearward portion by airfoil structure; said beam having a first cam track for producing a predetermined curvilinear trajectory of the spanwise slat segment during forward extension movement thereof from the stowed position; said beam having a second cam track associated with the leading edge of said spanwise panel member for producing rotation in a chordal plane of said spanwise panel member about its trailing edge hinge axis, to cooperatively span the opening formed between the upper surface of the extended spanwise slat segment and the upper surface of the airfoil, and produce an aerodynamically streamlined upper surface contour therebetween.

6. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; a cam track mechanism for curvilinear extension movement of said spanwise slat segment from a stowed position to a forward and downward extended operative position relative to the airfoil; a spanwise panel member being exposed by forward curvilinear extension of the spanwise slat segment from the stowed position; said spanwise panel member being hinged spanwise along its trailing edge to the airfoil and having its leading edge supported and guided by said cam track mechanism for forming an aerodynamically continuous surface contour between said spanwise slat segment and the airfoil during extension of said spanwise slat segment from the stowed position; said cam track mechanism comprises an I-beam having a lower flange forming a first cam track and an upper flange forming a second cam track, and each of said cam tracks being separately contoured; said I-beam being fixedly attached at its forward extremity to said spanwise slat segment and slidably supported along its aft portion within the airfoil by said first cam track; said first cam track being contoured to cause the spanwise slat segment to describe a predetermined curvilinear trajectory; said second cam track being slidably connected to the leading edge of said spanwise panel member and being contoured for simultaneously altering the angle-of-deflection of said spanwise panel member during forward extension movement of said spanwise slat segment to produce an aerodynamically streamlined upper surface contour between the extended spanwise slat segment and the upper surface of the airfoil.

7. The leading edge high-lift generating device as set forth in claim 6, wherein: said second cam track provides aerodynamic slot tailoring between said slat segment and said panel member for producing an auxiliary throughflow energy to the streamwise upper surface boundary layer airflow to maintain attachment thereof to the upper surface of the airfoil and prevent stall conditions at high angles-of-attack.

8. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; a beam being translatingly mounted along a chordwise aft portion to support structure of the airfoil and fixedly attached at a chordwise forward portion to said slat segment; a dual cam track being structurally integral with said beam and comprising a first and a second cam track; said first cam track providing for curvilinear extension movement of said spanwise slat segment from a stowed position to a forward and downward extended operative position relative to the airfoil; a spanwise panel member being exposed by forward curvilinear extension of the spanwise slat segment from the stowed position and being hinged spanwise along its trailing edge to the airfoil; said second cam track mechanism being operatively connected to the leading edge of said spanwise panel member for supportably guiding said spanwise panel member, during forward extension movement of said spanwise slag segment, to a first position to form an aerodynamically continuous surface contour between said spanwise slat segment and the airfoil during extension of said spanwise slat segment from the stowed position.

9. The leading edge high-lift generating device as set forth in claim 8, wherein: said spanwise panel member being of rigid contour construction capable of sustaining aerodynamic loads without chordwise bending and transferring said aerodynamic loads spanwise along its trailing edge through its hinge connection to the airfoil and at its leading edge through its connection to said second cam track mechanism.

10. The leading edge high-lift generating device as set forth in claim 8, wherein: said spanwise panel member having a rigid contoured surface associated with the trailing edge portion of said spanwise slat segment such that the exterior surface of said spanwise panel member remains in air-sealing contact with the trailing edge surface of said spanwise slat segment during extension movement of said spanwise slat segment, for forming an aerodynamically faired surface between the extended spanwise slat segment and the airfoil.

11. The leading edge high-lift generating device as set forth in claim 8, wherein: said second cam track being slidably connected to the leading edge of said spanwise panel member for guiding said spanwise panel member, during forward extension movement of said spanwise slat segment, to a second position at which an aerodynamic slot is formed between the trailing edge surface of said spanwise slat segment and the surface of said spanwise panel member.

12. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; a dual-cam track mechanism comprising a first and a second cam track, and being translatingly mounted along a chordwise aft portion to support structure of the airfoil and fixedly attached at a chordwise forward portion to said spanwise slat segment; said first cam track providing for curvilinear extension movement of said spanwise slat segment from a stowed position to a forward and downward extended operative position relative to the airfoil; a spanwise panel member being exposed by forward curvilinear extension of the spanwise slat segment from the stowed position; said spanwise panel member being hinged spanwise along its trailing edge to the airfoil and having its leading edge guided by said second cam track to form an aerodynamically continuous surface contour between said spanwise slat segment and the airfoil during extension of said spanwise slat segment from the stowed position; said dual-cam track mechanism comprising an I-beam having a lower flange forming said first can track and an upper flange forming said second cam track, and each of said cam tracks being separately contoured; said I-beam being fixedly attached at its forward extremity to the spanwise slat segment and slidably supported along its aft portion within the airfoil by said first cam track; said first cam track being contoured to cause the spanwise slat segment to describe a predetermined curvilinear trajectory; said second cam track being slidably connected to the leading edge of said spanwise panel member and being contoured for simultaneously altering the angle-of-deflection of said spanwise panel member during forward extension movement of said spanwise slat segment to produce an aerodynamically streamlined upper surface contour between the extended spanwise slat segment and the upper surface of the airfoil.

13. The leading high-lift generating device as set forth in claim 12, wherein: said second cam track provides aerodynamic slot tailoring between said spanwise slat segment and said spanwise panel member for producing an auxiliary throughflow energy to the streamwise upper surface boundary layer airflow to maintain attachment thereof to the upper surface of the airfoil and prevent stall conditions at high angles-of-attack.

14. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; a beam mounted chordwise and fixedly attached at its forward extremity to said spanwise slat segment; a triple-cam track being structurally integral with said beam and comprising a first, a second, and a third cam track; said first cam track being translatingly mounted along a chordwise aft portion to support structure of the airfoil for providing a curvilinear extension movement of said spanwise slag segment from a stowed position to a forward and downward extended operative position relative to the airfoil; a pair of panel members comprising a first upper and a second lower panel member, and each of said panel members being hinged spanwise along its trailing edge to the airfoil and being exposed for spanning a gap formed between said spanwise slat segment and the airfoil during extension of said spanwise slat segment from the stowed position; said first upper and second lower panel members each having its leading edge guided by said second and third cam tracks respectively, for varying the angle-of-deflection of said first upper and second lower panel members in combination with extension movement of said spanwise slat segment from the stowed position, to form an aerodynamically continuous upper and lower surface contour between the trailing edge surfaces of said spanwise slat segment and the airfoil, during extension of said spanwise slat segment from the stowed position.

15. The leading edge high-lift generating device as set forth in claim 14, wherein: each of said panel members being of rigid contour construction capable of sustaining aerodynamic loads without chordwise bending and transferring said aerodynamic loads spanwise along its trailing edge through its hinge connection to the airfoil and at its leading edge through its connection to said triple cam track mechanism.

16. The leading edge high-lift generating device as set forth in claim 14, wherein: each of said panel members having a rigid contoured surface associated with the trailing edge portion of said spanwise slat segment such that the exterior surface of each of said panel members remains in air-sealing contact with the upper and lower trailing edge surfaces of said spanwise slat segment during extension movement of said spanwise slat segment, for forming an aerodynamically faired upper and lower surface between the extended spanwise slat segment and the airfoil.

17. The leading edge high-lift generating device as set forth in claim 14, wherein: said second and third cam tracks being slidably connected to the leading edge of said first upper and second lower panel members respectively, for guiding each of said panel members, during forward extension movement of said spanwise slat segment, to a position at which an aerodynamic slot is formed between the trailing edge surface of said spanwise slat segment and the leading edge surface of each of said panel members.

18. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; a dual-cam track mechanism fixedly attached at a chordwise forward portion to said slat segment and comprising a first and a second cam track; said first cam track being translatingly mounted along a chordwise aft portion to support structure of the airfoil for providing a curvilinear extension movement of said slat segment from a stowed position to a forward and downward extended operative position relative to the airfoil; a pair of panel members comprising a first and a second panel member, and each of said panel members being hinged spanwise along its trailing edge to the airfoil and being exposed for spanning a gap formed between said slat segment and the airfoil during extension of said slat segment from the stowed position; said first panel member having its leading edge guided by said second cam track for varying the angle-of-deflection thereof in combination with extension movement of said slat segment from the stowed position; actuator means interconnected between said second panel member and the airfoil for varying the angle-of-deflection of said second panel member, independently of an extended operating position of said slat segment; and each of said panel members forming an aerodynamically continuous surface contour between both the upper and lower trailing edge surfaces of said slat segment and the airfoil, during extension of said slat segment from the stowed position.

19. The leading edge high-lift generating device as set forth in claim 18, wherein each of said panel members being of rigid contour construction capable of sustaining aerodynamic loads without chordwise bending and transferring said aerodynamic loads spanwise along its rearward portion through its trailing edge hinge connection to the airfoil and at its forward portion through said first upper panel connection to said cam track mechanism and said second lower panel connection to said actuator means.

20. The leading edge high-lift generating device as set forth in claim 18, wherein; each of said panel members having a rigid contoured surface associated with the trailing edge portion of said slat segment such that the exterior surface of each of said panel members remains in air-sealing contact with the upper and lower trailing edge surfaces of said slat segment during extension movement of said slat segment, for forwarding an aerodynamically faired upper and lower surface between the extended slat segment and the airfoil.

21. The leading edge high-lift generating device as set forth in claim 18, wherein: said second cam track mechanism being slidably connected to the leading edge of said first upper panel member for guiding said first upper panel member, during forward extension movement of said slat segment, to a position at which an aerodynamic slot is formed between the trailing edge surface of said slat segment and the leading edge surface of said first upper panel member.

22. The leading edge high-lift generating device as set forth in claim 18, wherein: said dual-cam track mechanism comprises an I-beam having a lower flange forming said first cam track and an upper flange forming said second cam track, and each of said cam tracks being separately contoured; said I-beam being fixedly attached at its forward extremity to the slat segment and slidably supported along its aft portion within the airfoil by said first cam track; said first cam track being contoured to cause the slat segment to describe a predetermined curvilinear trajectory; said second cam track being slidably connected to the leading edge of said panel member and being contoured for simultaneously altering the angle-of-deflection of said panel member during forward extension movement of said slat segment to produce an aerodynamically streamlined upper surface contour between the extended slat segment and the upper surface of the airfoil.

23. The leading edge high-lift generating device as set forth in claim 22, wherein: said second cam track and said actuator means, provides aerodynamic slot tailoring between the upper and lower trailing edge surfaces of said slat segment and the exterior surfaces of said panel members, for producing an auxiliary throughflow energy to the streamwise upper surface boundary layer airflow to maintain attachment thereof to the upper surface of the airfoil and prevent stall conditions at high angles-of-attack.

24. A leading edge high-lift generating device for an airfoil, comprising: a spanwise slat segment forming the nose structure of the airfoil, and having both an upper and a lower trailing edge surface faired into the cross-sectional configuration of the airfoil, without any aerodynamic surface discontinuities, when in a fully retracted and stowed position; a beam fixedly attached at its forward extremity to said spanwise slat segment and being the primary load carrying member for said spanwise slat segment; a first means comprising a cam track and roller followers; said cam track being integral with said beam and arcuate contoured for programming curvilinear extension movement of said spanwise slat segment from a stowed position to a forward and downward extended operative position relative to the airfoil; said roller followers having their axes fixed to the airfoil and operatively engaging said cam track for supporting said beam along its rearward portion within the airfoil to transfer aerodynamic lift loads imposed on said spanwise slat segment through to airfoil structure during extension movement of said spanwise slat segment; a spanwise panel member fixedly hinged spanwise along its trailing edge to the airfoil and being exposed by forward curvilinear extension movement of said spanwise slat segment from the stowed position; a second means attached to said spanwise panel member for programming rotational movement of said exposed spanwise panel member about its trailing edge hinge, between a first position for forming an aerodynamically continuous surface contour between said extended spanwise slat segment and the airfoil, and a second position for forming an aerodynamic slot between said extended slat segment and said exposed panel member; said spanwise panel member and said entire first and second means, being completely enclosed within an airfoil envelope, which encompasses said airfoil and said spanwise slat segment, when fully retracted.

25. The leading edge high-lift generating device as set forth in claim 24, wherein: said second means comprises a second cam track and second roller followers; said second cam track being integral with said beam and double arcuate contoured; said second roller followers having their axes fixed to the leading edge of said spanwise panel member and operatively engaging said double arcuate contoured second cam track for programming movement of said spanwise panel member during extension movement of said spanwise slat segment.

* * * * *